US009509725B2

United States Patent
Belling et al.

(10) Patent No.: US 9,509,725 B2
(45) Date of Patent: Nov. 29, 2016

(54) METHOD AND APPARATUS FOR INDICATING A TYPE OF A NETWORK INTERFACE

(71) Applicant: NOKIA SOLUTIONS AND NETWORKS OY, Espoo (FI)

(72) Inventors: Thomas Belling, Erding (DE); Peter Leis, Penzberg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/355,036

(22) PCT Filed: Oct. 24, 2012

(86) PCT No.: PCT/EP2012/070994
§ 371 (c)(1),
(2) Date: Apr. 29, 2014

(87) PCT Pub. No.: WO2013/064397
PCT Pub. Date: May 10, 2013

(65) Prior Publication Data
US 2014/0372546 A1 Dec. 18, 2014

(30) Foreign Application Priority Data
Nov. 2, 2011 (WO) .............. PCT/EP2011/069243

(51) Int. Cl.
*G06F 15/16* (2006.01)
*H04L 29/06* (2006.01)
(Continued)

(52) U.S. Cl.
CPC ....... *H04L 65/1016* (2013.01); *H04L 65/1006* (2013.01); *H04L 65/1069* (2013.01); *H04M 7/123* (2013.01); *H04M 7/1205* (2013.01); *H04M 7/0093* (2013.01)

(58) Field of Classification Search
CPC ........... H04L 29/0621; H04L 61/2564; H04L 67/04; H04L 67/16; H04L 67/24; H04L 67/26; H04L 67/30; H04L 67/303; H04L 63/08; H04L 65/1069; H04W 8/082; H04M 7/123; H04M 7/1205
USPC ...... 370/261, 401; 709/206, 248, 246; 726/1
See application file for complete search history.

(56) References Cited

U.S. PATENT DOCUMENTS 8,218,459 B1 * 7/2012 Stucker ................. 370/261
2006/0245418 A1 11/2006 Kucmerowski et al.
(Continued)

OTHER PUBLICATIONS

3GPP TS 29.165 V10.5.0 (Sep. 2011) "3rd Generation Partnership Project; Technical Specification Group Core Network and Terminals; Inter-IMS Network to Network Interface (NNI) (Release 10)"; pp. 1-103; 3rd Generation Partnership Project (3GPP); Mobile Competence Centre; 650, Route des Lucioles; F-06921 Sophia-Antipolis Cedex; France.
(Continued)

*Primary Examiner* — Dustin Nguyen
(74) *Attorney, Agent, or Firm* — Squire Patton Boggs (US) LLP

(57) ABSTRACT

The invention relates to a session border controller, method and computer program for receiving in a first network, from a second network, an indication indicating a type of a network interface between the first network and the second network, wherein the indication is received during establishment of a communication session through the first network and the second network, and processing the communication session based on the type of the network interface.

13 Claims, 6 Drawing Sheets

(51) Int. Cl.
*H04M 7/12* (2006.01)
*H04M 7/00* (2006.01)

(56) References Cited

U.S. PATENT DOCUMENTS

| | | | |
|---|---|---|---|
| 2008/0305811 A1 | 12/2008 | Cai et al. | |
| 2009/0135839 A1* | 5/2009 | Khasnabish | 370/401 |
| 2010/0023998 A1* | 1/2010 | Zou et al. | 726/1 |
| 2012/0185613 A1* | 7/2012 | Noldus | 709/248 |

OTHER PUBLICATIONS

3GPP TR 23.850 V1.0.0 (Sep. 2011) "3rd Generation Partnership Project; Technical Specification Group Services and System Aspects; Study on Roaming Architecture for Voice over IMS with Local Breakout (Release 11)"; pp. 1-37; 3rd Generation Partnership Project (3GPP); Mobile Competence Centre; 650, Route des Lucioles; F-06921 Sophia-Antipolis Cedex; France.

3GPP TR 23.849 V0.5.0 (Oct. 2011) "3rd Generation Partnership Project; Technical Specification Group Services and System Aspects; Study on Stage 2 aspects of Optimised Service Charging and Allocation of Resources in IMS whilst Roaming (Release 11)"; pp. 1-25; 3rd Generation Partnership Project (3GPP); Mobile Competence Centre; 650, Route des Lucioles; F-06921 Sophia-Antipolis Cedex; France.

M. Garcia-Martin et al: "Private Header (P-Header) Extensions to the Session Initiation Protocol (SIP) for the 3rd-Generation Partnership Project (3GPP)"; Network Working Group, Request for Comments: 3455; pp. 1-34; Jan. 2003.

International Search Report and Written Opinion dated Feb. 6, 2013 corresponding to International Patent Application No. PCT/EP2012/070994.

\* cited by examiner

METHOD AND APPARATUS FOR INDICATING A TYPE OF A NETWORK INTERFACE

TECHNICAL FIELD OF THE INVENTION

The present invention relates to a mechanism for indicating a type of a network interface. In particular, the present invention is related to a method and apparatus for transmitting a type of a network to network interface between two IMS networks.

BACKGROUND OF THE INVENTION

Within the IP (Internet Protocol) Multimedia Subsystem (IMS) as defined by 3rd Generation Partnership Project (3GPP) Session Initiation Protocol (SIP) defined by the Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Session Description Protocol (SDP) is a protocol which conveys information about media streams in multimedia sessions to allow the recipients of a session description to participate in the session. The SDP offers and answers can be carried in SIP messages. Diameter protocol has been defined by IETF and is intended to provide an Authentication, Authorization and Accounting (AAA) framework for applications such as network access or IP mobility.

Generally, for properly establishing and handling a communication connection between network elements such as a user equipment and another communication equipment or user equipment, a database, a server, etc., one or more intermediate network elements such as control network elements, support nodes, service nodes and interworking elements are involved which may belong to different communication networks.

The IMS is the standardized solution for multimedia telephony over IP based networks, e.g. voice for Long Term Evolution (VoLTE) is utilizing the IMS, which thus receives increased interest from the operator community. There exists related standardization activity focusing on the SIP based interconnection of IMS networks. In particular 3GPP specification TS 29.165 describes the SIP profile applicable at the Inter-IMS Network to Network Interface (II-NNI). Related discussions within the 3GPP operators association, GSMA, 3GPP studied a "Roaming Architecture for Voice over IMS with Local Breakout" (RAVEL) in specification TR 23.850, and "Optimised Service Charging and Allocation of Resources in IMS whilst Roaming" (OSCAR) in specification TR 23.849.

As result of recent discussions, various II-NNI interfaces can be encountered for a call between a calling IMS User Equipment (UE) UE-A, which is roaming in a visited Public Land Mobile Network (V-PLMN) A and has a subscription in a home PLMN (H-PLMN) A, and a called UE B roaming in a V-PLMN B and with a subscription in a H-PLMN-B, as shown in FIGS. 1-3.

SUMMARY OF THE INVENTION

The present invention can overcome some of above drawbacks by providing an apparatus, a method and a computer program product comprising receiving in a second network, as part of a call setup related signalling from a first network, an indication indicating a type of a network interface between the first network and the second network with respect to the call setup signaling, wherein the indication is received during set up of a communication session through the first network and the second network, and processing the communication session based on the type of the network interface.

The first network and the second network can comprise internet protocol multimedia subsystem (IMS) networks.

The receiving during setup of the communication session can comprise receiving a SIP INVITE request comprising the indication. The call setup signaling can comprise the SIP INVITE.

The apparatus can comprise a session border controller and/or an interconnection border control function (IBCF). The network interface can comprise an inter-IMS network to network interface (II-NNI).

The processing can comprise at least one of:
selecting SIP headers to be removed from SIP signaling messages to be forwarded,
storing the type of the network interface as part of charging and/or accounting related information relating to the communication session,
deciding whether to allocate a transition gateway (TrGW 5) for a media path of the communication session,
deciding whether to offer transcoding capabilities of a transition gateway (TrGWs 5) for the communication session,
deciding whether to apply optimized media routing (OMR) procedure for the communication session and,
deciding whether to accept or reject an incoming call setup request.

The indication of the type of network interface, can indicate one of:
a) call setup over interface from a visited network (V-PLMN A) of a calling user to a home network (H-PLMN A) of the calling user,
b) call setup over interface from a home network (H-PLMN A) of a calling user to a visited network (V-PLMN A) of the calling user, with loopback,
c) call setup over interface from a home network (H-PLMN A) of a calling user to a home network (H-PLMN B) of a called user,
d) call setup over interface from a visited network (V-PLMN A) of a calling user to a home network (H-PLMN B) of a called user,
e) call setup over interface from a home network (H-PLMN B) of a called user to a visited network (V-PLMN B) of the called user,
f) call setup over interface from a session control node (S-CSCF A/AS A) controlling a calling user to a media resource function (MRF A), and,
g) setup over interface from a media resource function (MRF A) to a session control node (S-CSCF A/AS A).

Further, an apparatus, a method and a computer program product are provided, comprising including in a first network, in a call setup signaling message towards a second network, an indication indicating a type of a network interface between the first network and the second network, and, transmitting the signaling message to the second network.

The first network and the second network can comprise internet protocol multimedia subsystem (IMS) networks.

The including can comprise including the indication in a SIP INVITE request.

The network interface can comprise an inter-IMS network to network interface (II-NNI).

The indication of the type of network interface, can indicate one of:

a) call setup over interface from a visited network (V-PLMN A) of a calling user to a home network (H-PLMN A) of the calling user, b) call setup over interface from a home network (H-PLMN A) of a calling user to a visited network (V-PLMN A) of the calling user, with loopback, c) call setup over interface from a home network (H-PLMN A) of a calling user to a home network (H-PLMN B) of a called user, d) call setup over interface from a visited network (V-PLMN A) of a calling user to a home network (H-PLMN B) of a called user, e) call setup over interface from a home network (H-PLMN B) of a called user to a visited network (V-PLMN B) of the called user, f) call setup over interface from a session control node (S-CSCF A/AS A) controlling a calling user to a media resource function (MRF A), and, g) setup over interface from a media resource function (MRF A) to a session control node (S-CSCF A/AS A).

The apparatus, method and computer program product can comprise determining the role of the apparatus with respect to the call setup and including the indication indicating the type of the network interface based on the determined role.

Embodiments of the present invention may have one or more of following ad-vantages:

enables operators to apply different handling of incoming calls (e.g. possibly more restrictive screening of SIP headers for calls, different accounting, different handling of media) from other networks depending on the interface type (e.g. interface from other home network for incoming calls towards served subscriber, or roaming related interface between home and visited network, or media control related interface), thus allowing different contractual relationships related to those interfaces.

In addition, operational failures such as inappropriate SIP headers can more easily be detected and fixed if the interface type the signaling relates to is known.

DETAILED DESCRIPTION OF THE INVENTION

Figure 1:
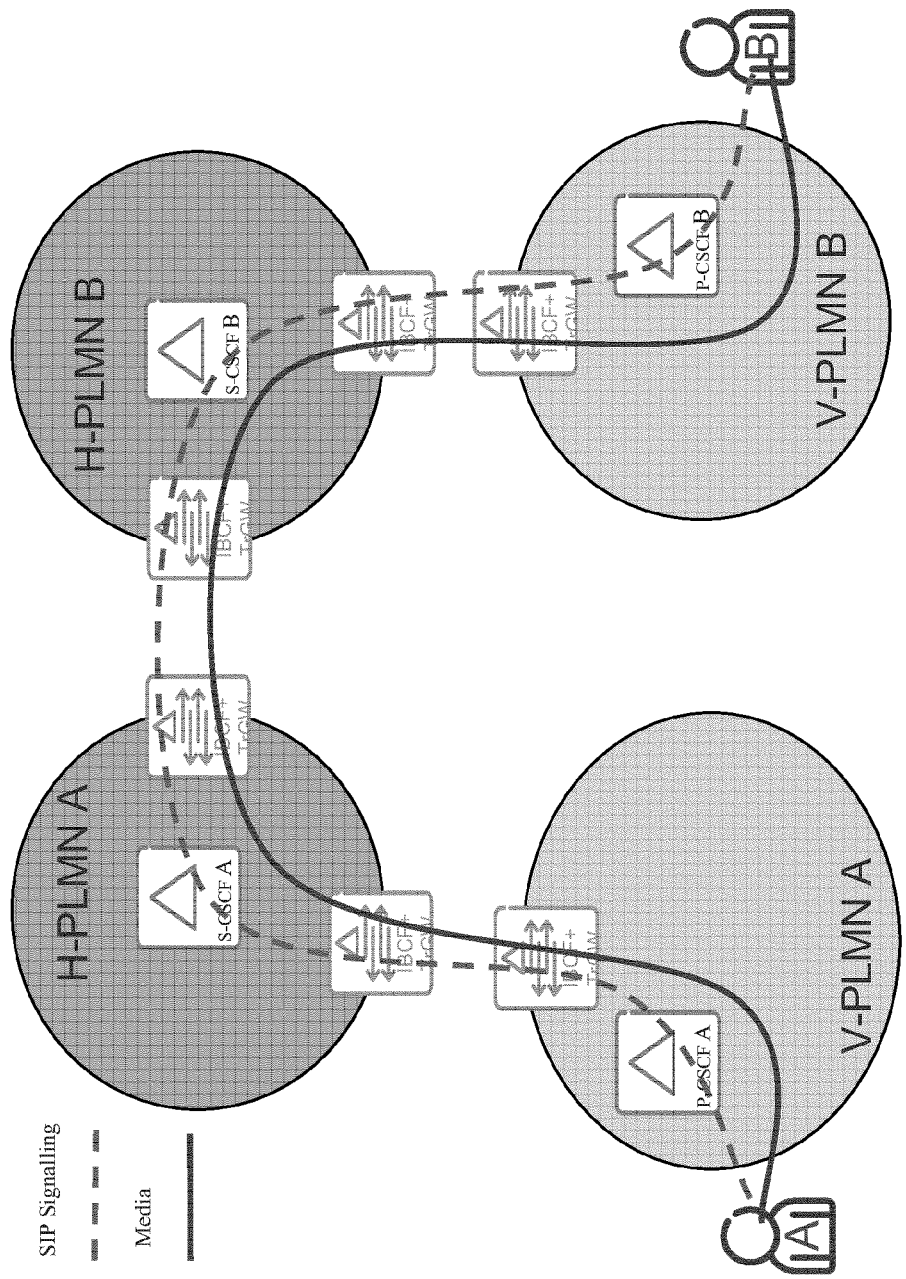
FIGS. 1-3 illustrate network architecture and elements relevant for the invention.

Different types of network entities and functions exist in the IMS network. Call Session Control Functions (CSCF) implement a session control function in SIP layer.

The CSCF can act as Proxy CSCF (P-CSCF), Serving CSCF (S-CSCF) or Interrogating CSCF (I-CSCF).

The P-CSCF is the first SIP level contact point for User Equipment (UE) within the IMS, for example, during IMS registration procedure and when handling session related signaling. The P-CSCF can be located in a visited network when the UE is roaming.

The I-CSCF is mainly the contact point within an operator's network for all IMS connections destined to a subscriber of that network operator, or a roaming subscriber currently located within that network operator's service area. The functions performed by the I-CSCF are, for example, assigning an S-CSCF to a user per-forming a SIP registration and routing SIP requests received from another network towards the S-CSCF.

The S-CSCF handles the session states in the network. The S-CSCF can perform the session control services for the UE. It maintains a session state as needed by the network operator for support of the services and may be acting as Registrar, i.e. it accepts registration requests and makes its information available through the location server (e.g. HSS). The 8-CSCF is the central point to users that are hosted by this S-CSCF. The S-CSCF can provide services to registered and unregistered users when it is assigned to these users. This assignment can be stored in the Home Subscriber Server (HSS). The S-CSCF can be located in the home network of a user also when the user is roaming.

Interconnection Border Control Function (IBCF) is a function that can provide overall control for the boundary between different service provider networks. The IBCF can provide application specific functions at the SIP/SDP protocol layer in order to perform interconnection between IM CN subsystem networks by using so-called Id reference point. IBCF can act both as an entry point and as an exit point for a network. Functionalities of IBCF can include network topology hiding, application level gateway (ALG) (enabling communication between IPv6 and IPv4 SIP applications, or between different private IP address spaces, and protecting networks by allowing in only media streams as agreed within SIP signalling), controlling transport and/or media plane functions, screening of SIP signalling information, selecting appropriate signalling interconnect, generation of charging data records and privacy protection.

An IBCF can perform transit routing functions and can acts as a B2BUA when it performs IMS-ALG functionality.

Transition Gateway (TrGW) can be located at network borders within the media path and can be controlled by an IBCF. The TrGW can provide functions like network address/port translation and IPv4/IPv6 protocol translation.

An IMS transit routing Function (TRF) can perform an analysis of the destination address, and determine where to route the session. The session can be routed directly to a media gateway control function (MGCF), breakout gateway control function (BGCF), or to another IMS entity in the same network, to another IMS network, or to a circuit switched (CS) domain or public switched telephone network (PSTN).

An end-to-end IMS session may traverse networks of several operators. In the following, a calling user/subscriber has been referred as A (also PLMN A for PLMN of user A) and a called user as B (also PLMN B for PLMN of user B).

FIG. 1 illustrates so-called "Forced Home Routeing" mode in which a media path follows a signaling path from a calling user to a called user through all four networks (V-PLMN A. H-PLMN A, H-PLMN B, V-PLMN-B) involved in the signaling path.

Figure 2:
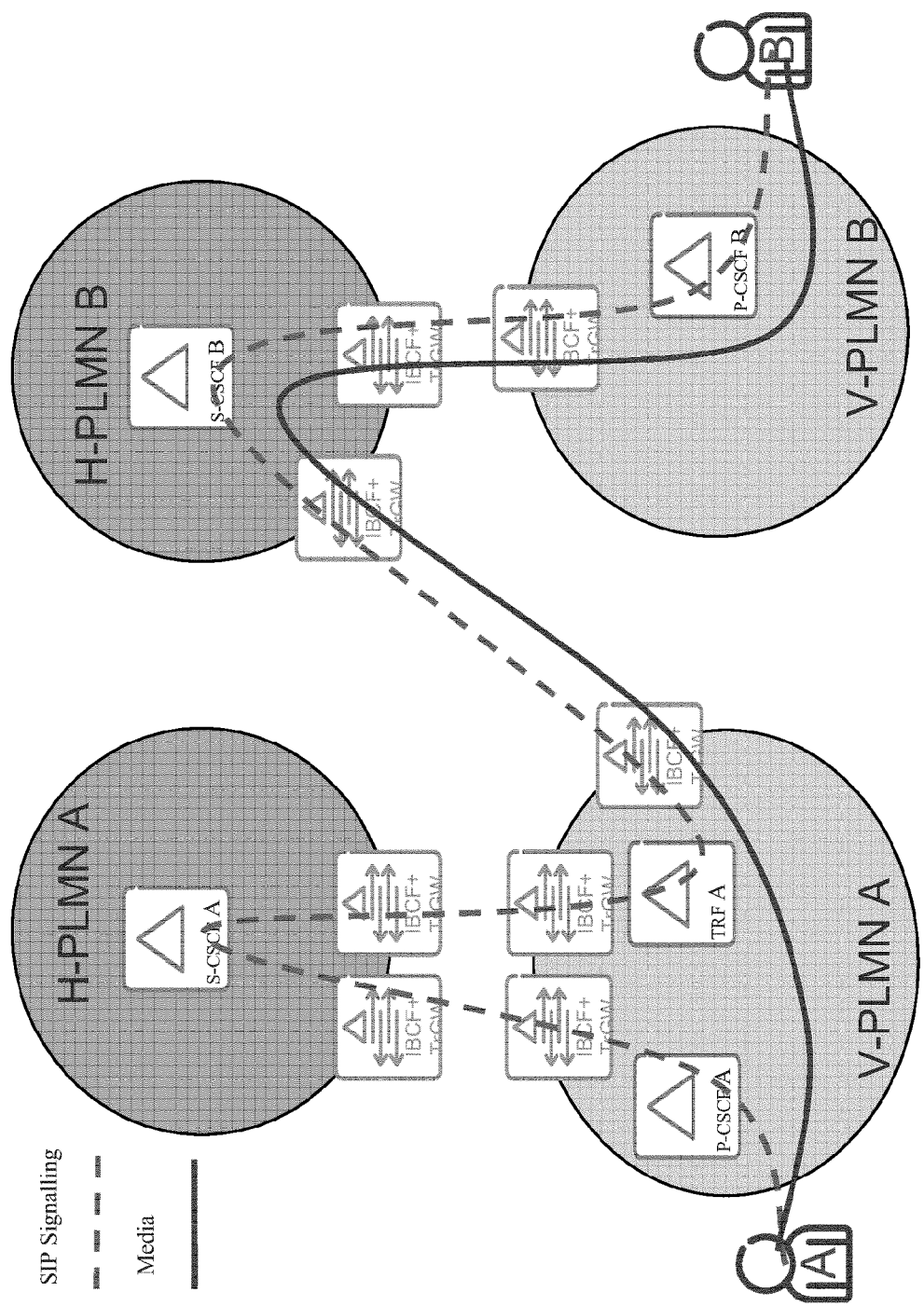

FIG. 2 illustrates so-called "Transit Routeing via VPLMN" and the setup has been motivated by the request of GSM Association (GSMA). Operators can main-tain the commercial relationships and media plane/user plane paths that are currently applicable for roaming principles in circuit switched PLMNs. The media/user plane traffic is transferred directly from the V-PLMN A to the H-PLMN B, and the operator of V-PLMN B may also pay H-PLMN B for the call, while being paid from H-PLMN A. It is a decision of the H-PLMN A to apply either "forced home routeing" model of FIG. 1 or "transit routeing" model of FIG. 2. In accordance with the so called IMS "home control" architectural principle, the SIP signaling related to a call setup (INVITE) is still routed from V-PLMN A to H-PLMN A, in order to allow H-PLMN A to apply related service logic, taking into account the subscription of the calling party. However, the SIP signaling is then routed back from H-PLMN A to V-PLMN A in a so-called "loopback". The user plane/media path is not routed through H-PLMN A, but remains in V-PLMN A. This allows that V-PLMN A performs further routeing of signalling and media in a similar manner as currently applicable for roaming principles in circuit switched PLMNs.

Figure 3:
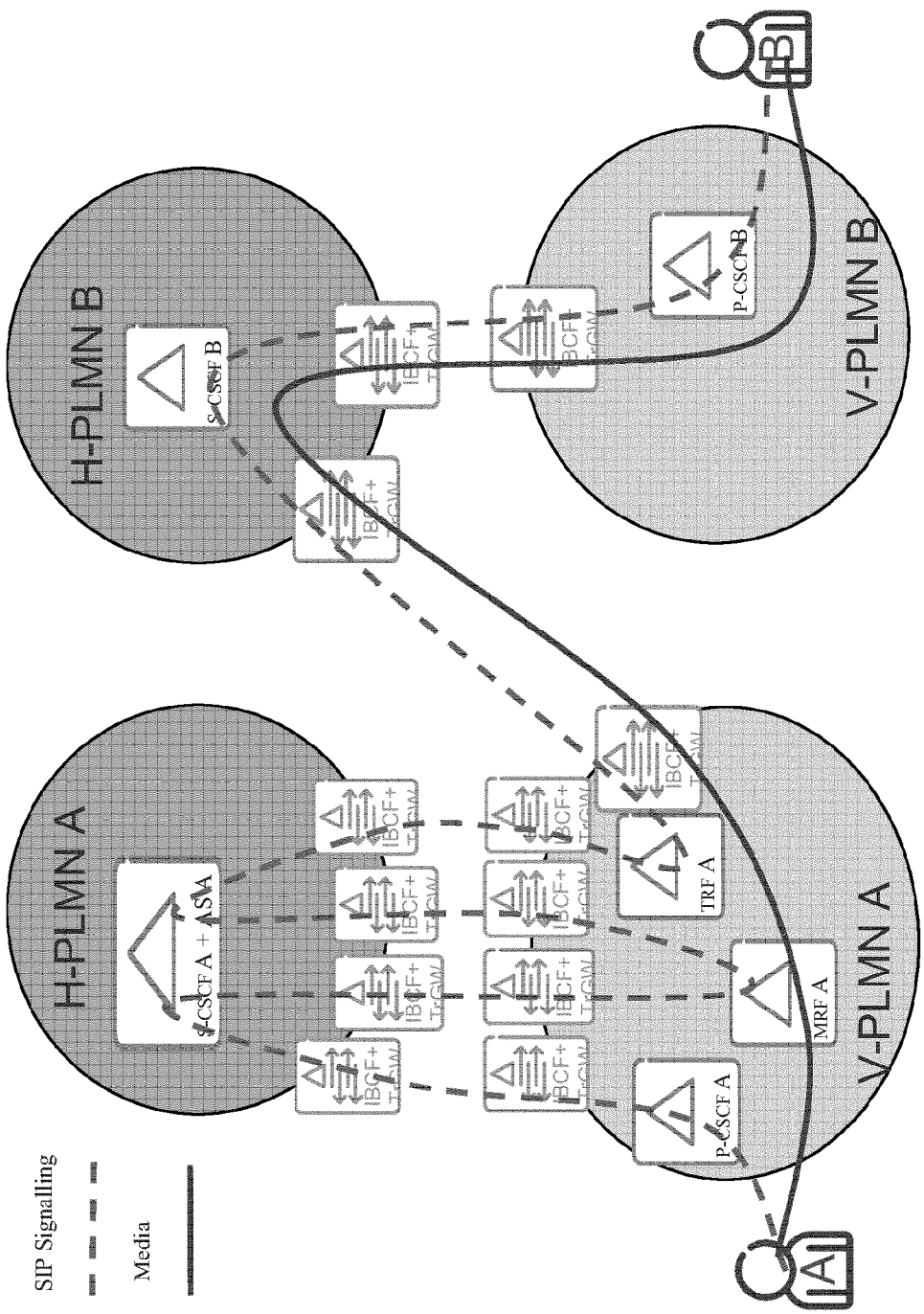

FIG. 3 illustrates so-called "Transit Routing via V-PLMN A with H-PLMN A controlled media processing in V-PLMN A" model. If the H-PLMN A applies Transit Routeing via V-PLMN, it can in addition control a Media Resource Function (MRF) in the V-PLMN A via SIP signalling, e.g. to provide tones or announcements or for conferencing.

As indicated in FIGS. 1-3, Session Border Controllers (SBCs), termed here as IBCFs, with attached TrGWs are usually allocated at the network borders. Additional such SBCs may also be located at the border of transition networks that may interconnect any PLMNs (not depicted in the figures).

Currently, IBCFs do not have knowledge on which type of network to network interface (NNI) they reside with respect to SIP call setup signalling for a given call. Such knowledge would allow the IBCFs to adjust their behaviour in various manners explained in the following.

IBCFs may apply a screening of SIP signalling and remove certain SIP headers to protect their networks. Certain SIP headers can be optional or mandatory to be supported over an NNI. Those headers can be different for an NNI between H-PLMNs and for an NNI between an H-PLMN and a V-PLMN. For an NNI between V-PLMN and H-PLMN, the directionality of the call setup (origination call set up from V-PLMM A to H-PLMN A, or terminating call setup between H-PLMN-B and V-PLMN A), may also affect the allowed SIP headers. New types of interfaces, for example, to loop back signalling from H-PLMN A to V-PLMN A, and to control an MRF over the NNI, can have their own set of required or optional SIP headers.

When processing SIP call setup signalling, an IBCF may collect information for charging or inter-operator accounting. Such information may be stored in the IBCF or be transferred to other nodes for further processing. For Transit Routing via VPLMN A (FIG. 2), operators may apply different compensations among them for the call setup signalling between V-PLMN A and HPLMN A (with no associated media), than for the signalling over the other NNI interfaces. SIP signalling over an NNI to control an MRF may also be treated differently. It would thus be desirable that an IBCF also collects information about the type of NNI.

The IBCFs can insert TrGWs in the user plane and modify address information in the Session Description Protocol (SDP) within SIP accordingly. For certain types of NNI, where only SIP signalling but no user plane is transferred, for instance at the NNI for the control of an MRF, an IBCF may refrain from allocating TrGWs.

The IBCFs may also modify the Session Description Protocol (SDP) within SIP to offer transcoding capabilities. The IBCFs may decide based on the type of NNI whether to offer transcoding; however offering transcoding may be harmful for certain types of NNIs that media may not traverse. Examples are, NNI for the control of an MRF, or for Transit Routing via V-PLMN A (FIG. 2) at the NNI between V-PLMN A and HPLMN A. To improve speech quality, it is desirable to apply transcoding not more than one time for a given call. Operators may thus only offer transcoding at certain NNI types, for instance only at the ingress IBCF of H-PLMN B (at the NNI from H-PLMN A or V-PLMN A).

The IBCFs can insert TrGWs in the user plane and modify address information in the Session Description Protocol (SDP) within SIP accordingly. For RAVEL and OSCAR, Optimal Media Routeing (OMR) procedures may be used at IBCFs to decide whether to allocate and/or free TrGWs and achieve the media paths depicted in FIGS. 2 and 3. However, the OMR procedures may lead to media paths that omit certain networks that the 3GPP operators desire to be included in the media path. For instance, if UE A and UE B roam in the same V-PLMN, H-PLMN B might be omitted. To avoid such undesired optimised paths. IBCFs may apply OMR procedures only for certain types of NNIs (e.g. at the NNI for the control of an MRF, or at the NNI types between V-PLMN A and H-PLMN A), and remove OMR related information from call setup signalling at other types of NNIs.

Finally, IBCFs can have policies to accept incoming signaling from peer networks only if it relates to certain NNI types, for instance to NNI between home networks only, but not to roaming related NNI types, and reject call set up signaling for other NNI types.

According to an aspect of the invention, an indication about the type of NNI with respect to SIP call setup signaling for a given call can be included in call setup signalling, for example, in SIP INVITE request.

According to an aspect of the invention, a network entity that decides to route the call over a network border (NNI) can supply this information to the target network.

According to an aspect of the invention, a session border controller (SBC), e.g. an IBCF at the network borders, can use the information for one or more of the below purposes:
  To select SIP headers to be removed from forwarded signaling.
  To collect (store and/or forward) the type of NNI as part of charging and/or accounting related information
  To decide whether to allocate TrGWs
  To decide whether to offer the transcoding capabilities of TrGWs
  To decide whether to apply OMR procedures.
  To decide whether to accept or reject an incoming call.

Some non-limiting examples of NNI types with respect to SIP call setup signaling according to an aspect of the invention are given in following:
  Originating Roaming NNI: NNI Type indicating a call setup over interface from V-PLMN A to H-PLMN A (P-CSCF A to S-CSCF A in FIGS. 1 to 3). The directionality in the present and the subsequent bullets relates to call setup signaling that traverses the NNI. The P-CSCF A can insert this NNI Type value in origination call setup signaling.
  Originating Roaming NNI Loopback: NNI Type indicating a call setup over interface from H-PLMN A to V-PLMN A (S-SCCF A to TRF A in FIGS. 2 and 3). The S-CSCF A (or an AS or TRF in H-PLMN A) can supply this NNI Type value when deciding to apply transit routing via VPLMN.

Home NNI: NNI Type indicating a call setup over interface from H-PLMN A to H-PLMN B in FIG. 1. The S-CSCF A (or an AS or TRF in H-PLMN A) can supply this NNI Type value when deciding to apply forced home routing.

Home NNI from V-PLMN: NNI Type indicating a call setup over interface from V-PLMN A to H-PLMN B in FIGS. 2 and 3. The TRF A may supply this NNI Type value when receiving the Originating Roaming NNI Loopback NNI Type value. As IBCF procedures can be the same for both NNI types, the value "Home NNI" could also be applied for the "Home NNI from V-PLMN" case.

Terminating Roaming NNI: NNI Type indicating a call setup over interface from H-PLMN B to V-PLMN B in FIGS. 1 to 3. The S-CSCF B could supply this NNI Type value when forwarding an incoming call to a served user.

Media control NNI towards MRF: NNI Type indicating a call setup over interface from S-CSCF A/AS A to MRF A in FIG. 3. The S-CSCF A or AS A can supply this NNI type value when sending SIP signaling to control an MRF.

Media control NNI from MRF: NNI Type indicating a call setup over interface from MRF A to S-CSCF A/AS A in FIG. 3. The MRF A can supply this NNI Type value when sending SIP signaling to an CSCF/AS. As IBCF related procedures might be the same for Media control NNI towards MRF and Media control NNI from MRF, a single value might be used for both.

According to an aspect of the invention, an IBCF can forward the indicated NNI type within the SIP call setup signaling without modifications.

According to an aspect of the invention, a TRF in a transit network can also forward the indicated NNI type within the SIP call setup signaling without modifications.

According to an aspect of the invention, a TRF in a PLMN can modify the indicated NNI type "Originating Roaming NNI Loopback" within the SIP call setup signaling to "Home NNI from V-PLMN" and/or can modify the indicated NNI type "Originating Roaming NNI" to either "Home NNI" or "Originating Roaming NNI Loopback", depending on its routing decision, and can pass other NNI types without modifications.

According to an aspect of the invention, the types of NNI with respect to SIP call setup signaling can be encoded, for example, as follows:

1. Indicate the type of NNI (and thus the expected role of the IBCF) in a new SIP header field. The SIP header field can be included by the entity that decides on the type of the subsequent NNI. This field is not modified by IBCFs.

2. Indicate the type of NNI (and thus the expected role of the IBCF) by enhancing an existing SIP header field with a new parameter with new values, specific to the type of NNI, for example, the header fields defined in RFC 3455, e.g. the P-Charging-Vector header field can be enhanced by a new parameter "NNI-type".

3. Indicate the type of NNI (and thus the expected role of the IBCF) by including a body with a new MIME type in an INVITE request.

According to an aspect of the invention, a NNI Type indication can be removed from signaling when forwarding a signaling message over a NNI of different Type. The NNI Type indication can require a trust relationship between the networks. As a consequence, IBCFs can remove NNI Type indication when forwarding a request to an untrusted network, and can also remove it when receiving the header from an untrusted network. When not receiving the NNI header or not trusting it, fallback behavior can be to apply similar procedures as applicable if the home NNI type was indicated.

According to an aspect of the invention, to ease the introduction of the proposed signaling extension and cope with scenarios where not all networks support it, the entity supplying a NNI Type value can also include information that identifies the network to which the entity belongs. An IBCF can check if the information identifies their own network, or the previous PLMN as identified via the record-route SIP header in the INVITE request. According to an aspect of the invention, only in those cases the IBCF can use the received NNI type. Otherwise, or if no NNI type is received in the signaling, the IBCFs use similar procedures as for the "Home NNI" type.

Figure 5:
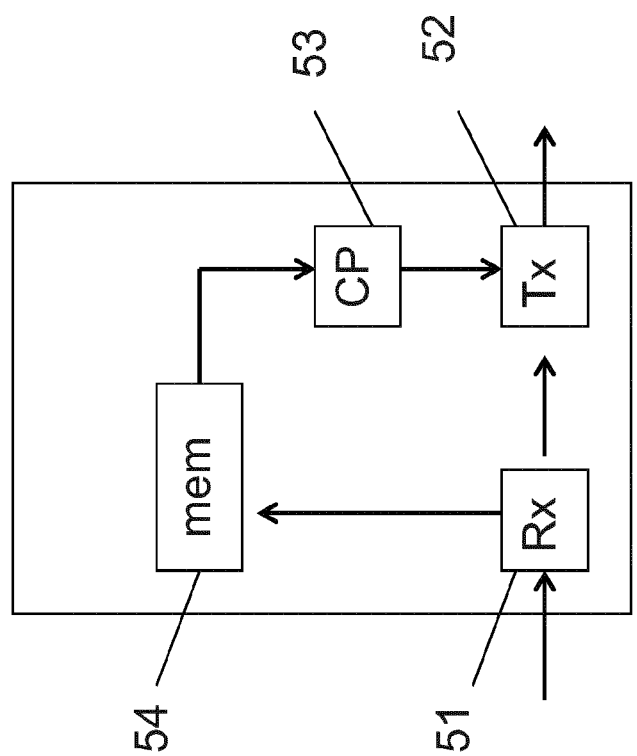
FIG. 5 illustrates example of internal structure and functions of apparatus implementing aspects of the invention.

FIG. 5 illustrates an internal structure and functions of an apparatus (P-CSCF, S-CSCF, AS, MRF, SCB, IBCF, TRF) that can implement aspects of the invention. A receiving unit (receiver) 51 can be configured to receive signaling messages, for example, SIP requests, like INVITE. The receiving unit 51 can be configured to detect a network interface type (NNI type, II-NNI type) indication in received signaling, for example, during session establishment. The receiving unit 51 can be configured to receive signaling for example from a P-CSCF, S-CSCF, AS, MRF, SCB, IBCF and/or TRF.

A transmitting unit (transmitter) 52 can be configured to transmit signaling messages, for example, SIP requests, like INVITE. The transmitting unit 52 can be configured to include a network interface type (NNI type, II-NNI type) indication in signaling messages to be transmitted, for example, during session establishment (INVITE). The transmitting unit 52 can be configured to transmit signaling for example to a P-CSCF, S-CSCF, AS, MRF, SCB, IBC and/or, TRF. The transmitting unit 52 and transmit a call detail record (CDR) including the NNI Type to a charging data collecting entity.

A processing unit (processor, CP) 53 can be configured to select an indication of a type of network interface, which the transmitting unit 52 can use. The processing unit 53 can be configured to select the indication for indicating at least one of following NNI types:

a) call setup over interface from a visited network (V-PLMN A) of a calling user to a home network (H-PLMN A) of the calling user, b) call setup over interface from a visited network (V-PLMN A) of a calling user to a home network (H-PLMN A) of the calling user, with loopback, c) call setup over interface from a home network (H-PLMN A) of a calling user to a home network (H-PLMN B) of a called user, d) call setup over interface from a visited network (V-PLMN A) of a calling user to a home network (H-PLMN B) of a called user, e) call setup over interface from a home network (H-PLMN B) of a called user to a visited network (V-PLMN B) of the called user, f) call setup over interface from a session control node (S-CSCF A/AS A) controlling a calling user to a media resource function (MRF A), and, g) setup over interface from a media resource function (MRF A) to a session control node (S-CSCF A/AS A).

When obtaining an indication of NNI type received by the receiving unit 51, the processing unit 53 can be configured to initiate one or several of the following actions relating to a communication session to be established:

selecting SIP headers to be removed from SIP signaling messages to be forwarded, storing the type of the network interface as part of charging and/or accounting related information relating to the communication session, deciding whether to allocate a transition gateway (TrGW) for a media path of the communication session, deciding whether to offer transcoding capabilities of a transition gateway (TrGWs) for the communication session, deciding whether to apply optimized media routing (OMR) procedure for the communication session, and, deciding whether to accept or reject an incoming call setup request.

The processing unit 53 can control a transition gateway (TrGWs) in a media path of the session using gateway control signals transmitted by the transmitting unit 52.

A memory unit (memory) can be configured to store static and session related information and information relating to network topology and other nodes of IMS networks. All units of FIG. 5 can be connected to each others via bus and the units may be implemented for example using microprocessors, chips and/or other electrical components and/or by software.

Figure 4:
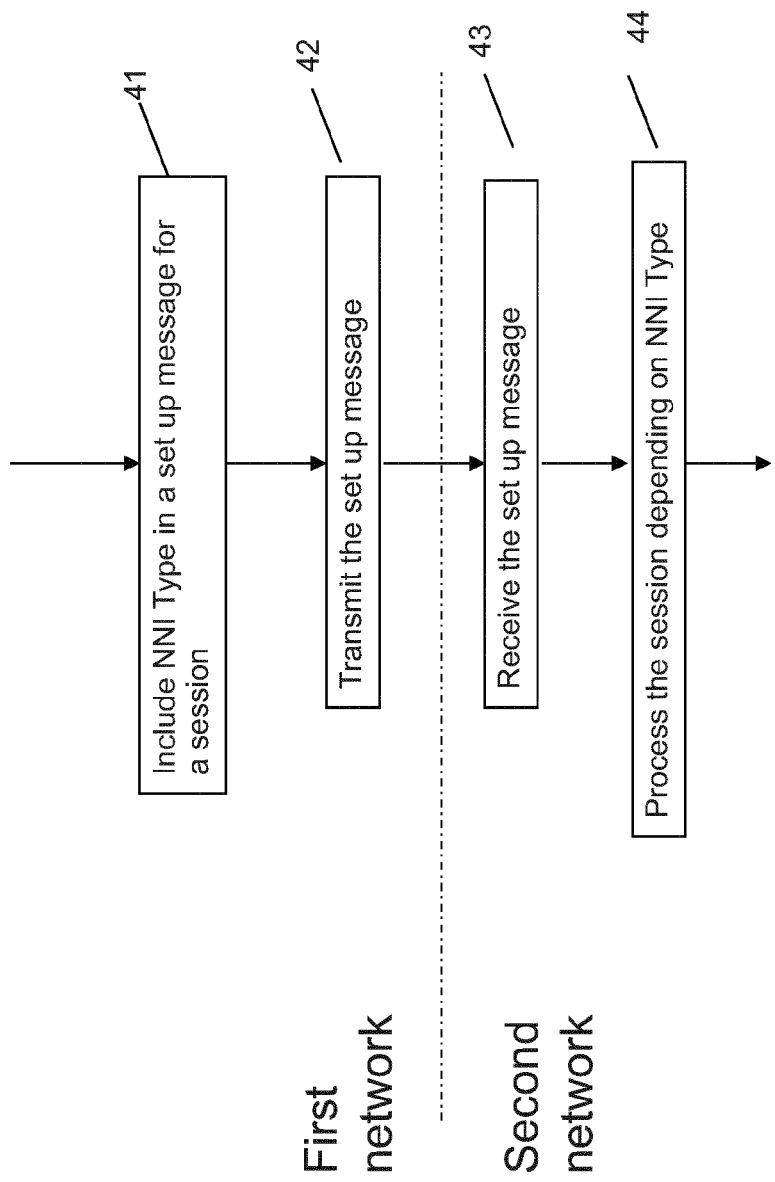
FIG. 4 illustrate example process according to aspects of the invention.

FIG. 4 shows process steps for implementing aspects of the invention. A network element in a first network can include NNI Type 41 in a set up message for a session. The message can then be transmitted 42 to a second network and received 43 there, for example, by an IBCF. Finally, the session can be controlled or processed 44 in the second network based on the received NNI Type, for example, a decision to involve a TrGW in media path can be taken.

Figure 6:
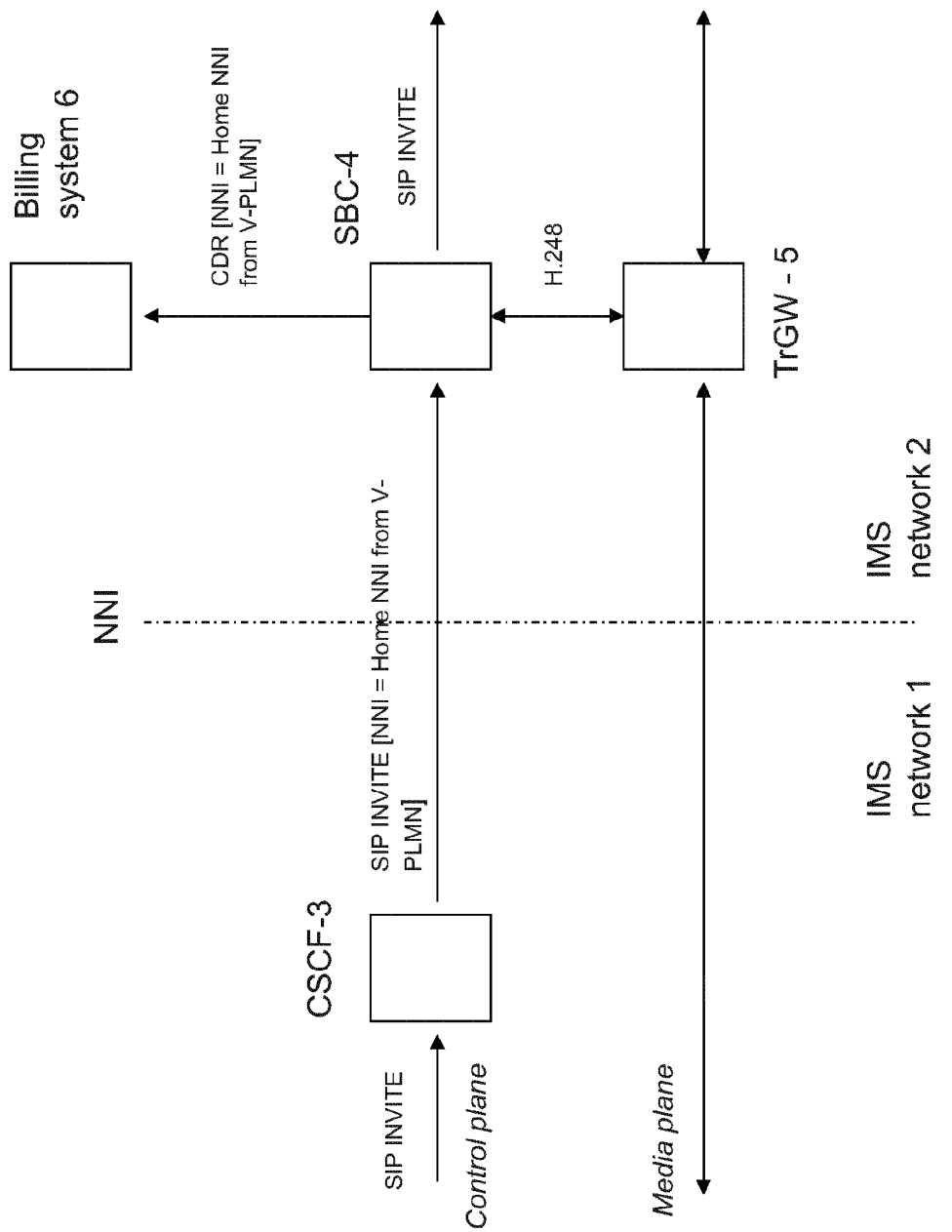
FIG. 6 illustrates an example signaling flow and interfaces for implementing aspects of the invention.

FIG. 6 illustrates an example signaling flow and interfaces for implementing aspects of the invention. A session control node, such as CSCF 3, located in an IMS network 1 receives a SIP INVITE request from a calling user (not shown) to establish a communication session with a called party (not shown). The CSCF 3 can determine that to reach the called party, the SIP INVITE is to be forwarded to an IMS network 2.

The CSCF 3 can include an indication network interface type (NNI Type) in the SIP INVITE before transmitting it towards the IMS network 2. In this example "NNI=Home NNI from V-PLMN" has been added in INVITE. A TRF A can supply this NNI Type value when receiving the Originating Roaming NNI Loopback NNI Type value. There may be other SIP level nodes which not shown in the figure (CSCFs, . . . ) between the CSCF 3 and a SBC 4. The SBC 4, when receiving the SIP INVITE, can detect the NNI Type parameter and can take certain actions based on the NNI Type (actions can be specific to certain NNI Type). The SBC 4 can, for example, include "NNI Type" parameter in CDRs transmitted to a billing system 6, or the SBC 4 can include a TrGW 5 in a media path (media plane) of the session, using H.248 or other gateway control protocol. The SBC 4 can remove or modify NNI Type before transmitting the SIP INVITE towards the called user.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules thereof), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The invention is not limited to transmitting type of network interface in the IMS network(s), but may also be applied in other type of networks having similar kind of multi-operator architecture and/or roaming architecture. Functions of the session control entities (IBCF, CSCF, SCF, . . . ) described above may be implemented by code means, as software, and loaded into memory of a computer.

The invention claimed is:

1. An apparatus in a second network, the apparatus comprising:
    a receiver configured to receive, as part of a call setup related signalling from a first network, an indication indicating a type of a network interface between the first network and the second network with respect to the call setup signalling, wherein the indication is received during set up of a communication session through the first network and the second network; and
    a processor configured to process the communication session based on the type of the network interface,
    wherein the network interface comprises an inter-IMS network to network interface (II-NNI), and
    wherein the indication of the type of network interface, indicates one of:
    call setup over interface from a visited network (V-PLMN A) of a calling user to a home network (H-PLMN A) of the calling user,
    call setup over interface from a home network (H-PLMN A) of a calling user to a visited network (V-PLMN A) of the calling user, with loopback,
    call setup over interface from a home network (H-PLMN A) of a calling user to a home network (H-PLMN B) of a called user,
    call setup over interface from a visited network (V-PLMN A) of a calling user to a home network (H-PLMN B) of a called user,
    call setup over interface from a home network (H-PLMN B) of a called user to a visited network (V-PLMN B) of the called user,
    call setup over interface from a session control node (S-CSCF A/AS A) controlling a calling user to a media resource function (MRF A), or
    setup over interface from a media resource function (MRF A) to a session control node (S-CSCF A/AS A).

2. An apparatus of claim 1, wherein the first network and the second network comprise internet protocol multimedia subsystem (IMS) networks.

3. An apparatus of claim 1, wherein the receiving during set up of the communication session comprises receiving a SIP INVITE request comprising the indication.

4. An apparatus of claim 1, wherein the apparatus comprises a session border controller and/or an interconnection border control function (IBCF).

5. An apparatus of claim 1, wherein the processing comprises at least one of:
    selecting SIP headers to be removed from SIP signaling messages to be forwarded,
    storing the type of the network interface as part of charging and/or accounting related information relating to the communication session,
    deciding whether to allocate a transition gateway (TrGW 5) for a media path of the communication session,
    deciding whether to offer transcoding capabilities of a transition gateway (TrGWs 5) for the communication session,
    deciding whether to apply optimized media routing (OMR) procedure for the communication session and,
    deciding whether to accept or reject an incoming call setup request.

6. An apparatus in a first network, comprising:
    a processor configured to include, in a call setup signaling message towards a second network, an indication indicating a type of a network interface between the first network and the second network; and
    a transmitter configured to transmit the signaling message to the second network,
    wherein the network interface comprises an inter-IMS network to network interface (II-NNI), and
    wherein the indication of the type of network interface, indicates one of:
    call setup over interface from a visited network (V-PLMN A) of a calling user to a home network (H-PLMN A) of the calling user,
    call setup over interface from a home network (H-PLMN A) of a calling user to a visited network (V-PLMN A) of the calling user, with loopback,
    call setup over interface from a home network (H-PLMN A) of a calling user to a home network (H-PLMN B) of a called user,
    call setup over interface from a visited network (V-PLMN A) of a calling user to a home network (H-PLMN B) of a called user,
    call setup over interface from a home network (H-PLMN B) of a called user to a visited network (V-PLMN B) of the called user,
    call setup over interface from a session control node (S-CSCF A/AS A) controlling a calling user to a media resource function (MRF A), or
    setup over interface from a media resource function (MRF A) to a session control node (S-CSCF A/AS A).

7. An apparatus of claim 6, wherein the first network and the second network comprise internet protocol multimedia subsystem (IMS) networks.

8. An apparatus of claim 6, wherein the including comprises including the indication in a SIP INVITE request.

9. An apparatus of claim 6, further comprising a processor configured to determine the role of the apparatus with respect to the call setup and including the indication indicating the type of the network interface based on the determined role.

10. A method, comprising:
    receiving in a second network, from a first network, an indication indicating a type of a network interface between the first network and the second network, wherein the indication is received during establishment of a communication session through the first network and the second network; and
    processing the communication session based on the type of the network interface,
    wherein the network interface comprises an inter-IMS network to network interface (II-NNI), and wherein the indication of the type of network interface, indicates one of:

call setup over interface from a visited network (V-PLMN A) of a calling user to a home network (H-PLMN A) of the calling user, call setup over interface from a home network (H-PLMN A) of a calling user to a visited network (V-PLMN A) of the calling user, with loopback, call setup over interface from a home network (H-PLMN A) of a calling user to a home network (H-PLMN B) of a called user, call setup over interface from a visited network (V-PLMN A) of a calling user to a home network (H-PLMN B) of a called user, call setup over interface from a home network (H-PLMN B) of a called user to a visited network (V-PLMN B) of the called user, call setup over interface from a session control node (S-CSCF A/AS A) controlling a calling user to a media resource function (MRF A), or setup over interface from a media resource function (MRF A) to a session control node (S-CSCF A/AS A).

11. A method, comprising:

including by a first network in a call setup signaling message towards a second network, an indication indicating a type of a network interface between the first network and the second network; and transmitting the signaling message to the second network, wherein the network interface comprises an inter-IMS network to network interface (II-NNI), and wherein the indication of the type of network interface, indicates one of:

call setup over interface from a visited network (V-PLMN A) of a calling user to a home network (H-PLMN A) of the calling user, call setup over interface from a home network (H-PLMN A) of a calling user to a visited network (V-PLMN A) of the calling user, with loopback, call setup over interface from a home network (H-PLMN A) of a calling user to a home network (H-PLMN B) of a called user, call setup over interface from a visited network (V-PLMN A) of a calling user to a home network (H-PLMN B) of a called user, call setup over interface from a home network (H-PLMN B) of a called user to a visited network (V-PLMN B) of the called user, call setup over interface from a session control node (S-CSCF A/AS A) controlling a calling user to a media resource function (MRF A), or setup over interface from a media resource function (MRF A) to a session control node (S-CSCF A/AS A).

12. A computer program product embodied in a non-transitory computer-readable medium and encoding instructions that, when executed in hardware, perform a process in accordance with claim 10.

13. A computer program product embodied in a non-transitory computer-readable medium and encoding instructions that, when executed in hardware, perform a process in accordance with claim 11.

\* \* \* \* \*